Dec. 15, 1953     W. BRUCHHAUSEN     2,662,966

ELECTRIC TABLE

Filed April 17, 1952     2 Sheets-Sheet 1

INVENTOR.
WERNER BRUCHHAUSEN
BY

Dec. 15, 1953 W. BRUCHHAUSEN 2,662,966
ELECTRIC TABLE
Filed April 17, 1952 2 Sheets-Sheet 2

INVENTOR.
WERNER BRUCHHAUSEN
BY

UNITED STATES PATENT OFFICE 2,662,966

ELECTRIC TABLE

Werner Bruchhausen, Dortmund, Germany

Application April 17, 1952, Serial No. 282,815

Claims priority, application Germany May 7, 1951

19 Claims. (Cl. 219—39)

1

The present invention relates to an electric table, and more particularly to an electric table equipped with a plurality of electric appliances.

It is an object of the present invention to provide an electric table which can be used as a ventilating means.

It is another object of the present invention to provide an electric table with means for heating the air.

It is a further object of the present invention to provide an electric heating plate which can be used either for heating the air or for cooking purposes.

It is still another object of the present invention to provide means for perfuming the air.

An electric table, according to the present invention, comprises in its broadest aspect a table plate, a wall forming an air channel arranged underneath the table plate, a fan arranged in the air channel, and a reversible electric motor driving the fan so as to rotate the same in opposite directions.

A preferred embodiment of the present invention comprises in combination a table plate having an edge portion, a wall forming an air channel arranged underneath the table plate, the channel having a first opening located centrally underneath, and at a distance from, the table plate, the channel and the edge portion defining a second opening with each other, a fan arranged in the air channel above the first opening thereof, and a reversible electric motor driving the fan so as to rotate the same in opposite directions, whereby the fan when driven by the electric motor in one direction sucks air into the channel through the first centrally located opening thereof and discharges the air through the second opening defined by the channel and the edge portion whereas the fan when driven by the electric motor in the opposite direction sucks air into the channel through the second opening defined by the channel and the edge portion and discharges the air through the centrally located first opening of the channel.

Preferably an electric heating resistor is arranged in the first opening underneath the fan and switching means are provided for switching the electric heating resistor in and out.

A preferred embodiment of the present invention comprises in addition an electric heating plate, and a cantilever carrying the electric heating plate and being pivoted to the wall, the cantilever being movable from a first position in which the electric heating plate is arranged underneath the first centrally located opening

2 to a second position in which the electric heating plate is arranged flush with the table plate. Preferably a hinge is provided for securing the cantilever in the first and second positions thereof.

Preferably an electric warming plate forms part of the table plate and a container for perfumes is arranged in the wall so as to scent the air passing through the air channel.

A preferred embodiment of the present invention comprises in addition to, and in combination with, the electric motor driving the fan and the electric heating plate switching means for the reversible motor and the electric heating plate and means for interconnecting said switching means so that the direction of rotation of the fan can only be changed when the electric motor is not supplied with current and the heating plate can be switched in only in the second position of the cantilever and in the first position thereof when the electric motor drives the fan in the opposite direction in which air is sucked into the channel through the second opening defined by the channel and the edge portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
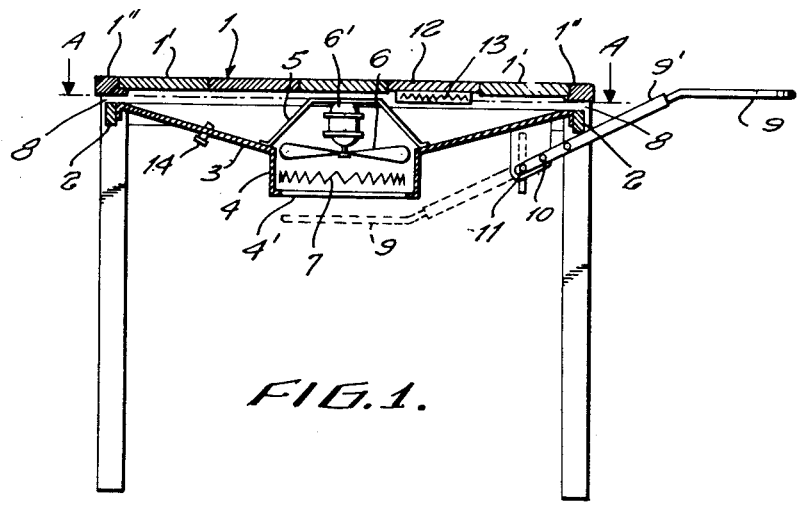
Fig. 1 is a vertical section through an electric table according to the invention.
Figure 2:
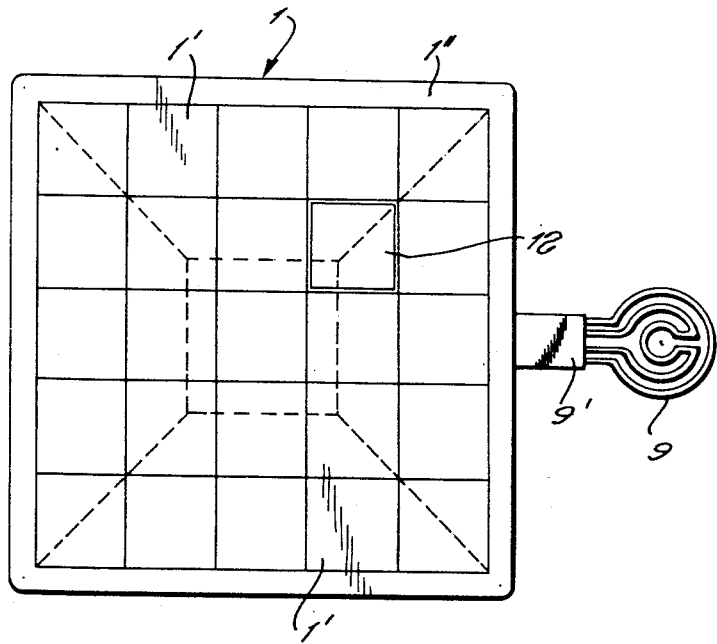
Fig. 2 is a plan view of the table showing Fig. 1.

Referring now to the drawings, the table comprises a table plate 1 consisting of a plurality of tiles 1', one of the tiles being replaced by an electric warming plate or tile 12 more fully described hereinafter. The table plate comprises furthermore an edge portion 1" being square-shaped. Underneath the edge portion 1" a square frame 2 is arranged at a slight distance from the edge portion 1" so that an opening 3 (termed hereinafter the second opening) is defined by the edge portion 1" and the frame 2. The frame 2 forms part of, and serves as a holder for, a funnel-shaped wall 3 consisting preferably of sheet metal and having a centrally arranged channel 4 which is open at both ends thereof. A stirrup 5 is arranged on the wall 3 so as to bridge the channel 4 above the upper opening thereof and serves as a carrier of an electric motor 6' driving a fan 6, the blades of which are arranged in the upper opening of the channel 4 in which, furthermore, an electric heating resistor 7 is arranged. The wall 3 and the channel 4 form an air channel having the lower opening 4' of the channel 4 as one opening (termed hereinafter the first opening), and the opening 8 referred to hereinabove as the second opening. The electric motor 6' is reversible so that it drives the fan 6 in either of two opposite directions at a time so that an air stream is sucked into the channel 4 through the first centrally located opening 4' thereof and discharged through the second opening 8 when the electric motor 6' drives the fan 6 in one direction thereof whereas when the fan 6 is driven by the electric motor 6' in the opposite direction the air is sucked through the second opening 8 and discharged through the first opening 4'. This air stream can be heated by switching in the electric heating resistor 7 which is provided with switching means for switching the same in and out, which are described more in detail hereinafter.

Furthermore, an electric heating plate 9 comprising electrically heated chromium-steel tubes is carried by a cantilever 9' which is hinged by a hinge 10 to the lower side of the wall 3. The cantilever 9' can be turned through 180° from a first position shown in dotted lines in Fig. 1 in which the electric heating plate 9 is arranged underneath the centrally located opening 4' of the channel 4 to a second position shown in Fig. 1 in full lines in which the electric heating plate 9 is arranged flush with the table plate 1. In the first position the heating plate 9 serves in addition to the heating resistor 7 for heating the air moved by the fan 6 and in the second position as a cooking appliance connected with the table plate 1. Preferably the hinge 10 is provided with securing means such as a winged nut 11 for securing the cantilever 9' in one or the other of the two positions thereof.

The electric warming plate or tile 12 referred to hereinabove is provided with an electric heating resistance 13 which warms the warming plate 12 to a temperature sufficient for keeping a coffee or tea pot warm without bringing the contents thereof to the boiling point.

Preferably means such as a container 14 are provided in the wall 3 for accommodating perfumes which scent the air passing through the air channel under the sucking action of the fan 6.

All the electrical parts referred to hereinabove are actuated in a definite sequence by switching means which allow on the one hand to switch on the heating elements 7 and 9 for the air stream if the fan 6 is running so that accumulation of heat underneath the table plate 1 is avoided. On the other hand, the fan 6 can be operated without the heating elements 7 and 9 in order to produce a cooling stream of air on hot days.

The heating plate 9 is so connected that it is automatically switched on when it is brought into the second position thereof in which it is arranged flush with the table plate 1. On the other hand, the tile 12 provided with the heating resistance 13 can be independently switched on or off.

Figure 3:
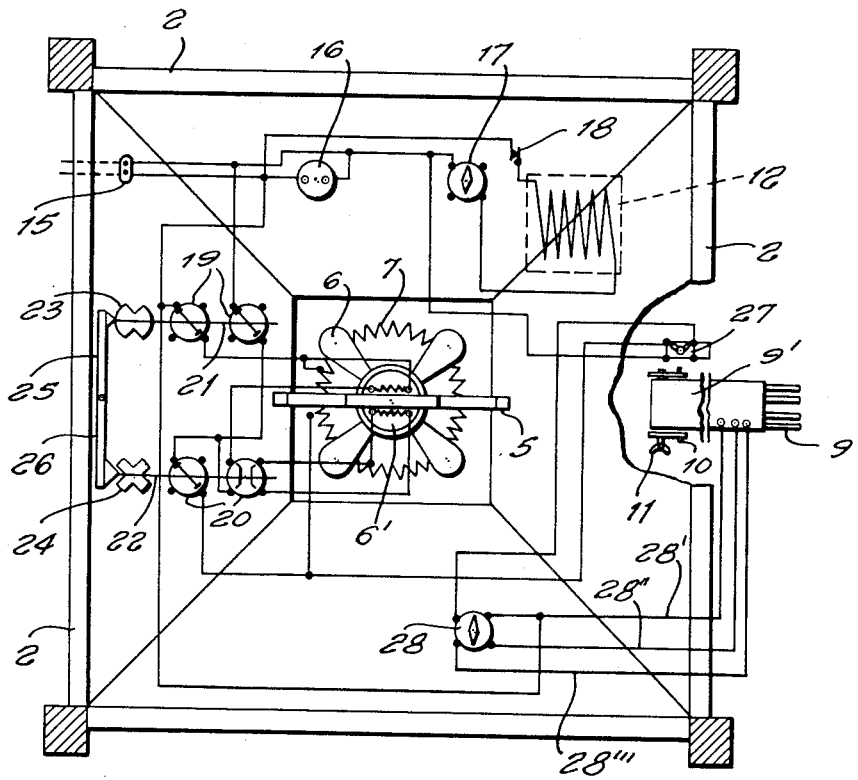
Fig. 3 is a horizontal section on an enlarged scale taken along the line A—A of Fig. 1.

The details of a connection embodying these results are shown in Fig. 3 showing a section of Fig. 1 along the line A—A thereof, the wall 3 being omitted for the sake of clearness. Current is supplied by connecting a plug 15 to a wall socket (not shown) from which the current flows to a socket 16 arranged on the lower face of the wall 3 and serving for connecting a cable of a heating appliance (not shown) such as an electric water kettle. Furthermore, the current reaches the electrical resistor 13 of the warming tile 12 over a switch 17 also arranged on the lower surface of the wall 3. The current returns from the resistor 13 through a thermostat 18 controlling the temperature of the tile 12.

The heating resistor 7, the heating plate 9 and the motor 6' of the fan 6 are connected to the plug 15 by means of electric switches 19 and 20 also arranged on the lower surface of the wall 3. The switch 20 switches the heating resistor 7 and the heating plate on and off and serves for reversing the motor 6'.

In order to prevent a running of the motor 6' of the fan 6 during the actuation of the switch 20 the two switches 19 and 20 are provided with notched discs 23 and 24 arranged on the shafts 21 and 22 of the switches 19 and 20, respectively. A two-armed lever 25, 26 cooperates with the notched discs 23 and 24 so that the switches 19 and 20 can only be actuated one at a time. It will be noted that the notched disc 23 arranged on the shaft 21 of the switch 19 is provided with two notches whereas the notched disc 24 arranged on the shaft 22 of the switch 20 is provided with four notches in order to produce the desired effect. In Fig. 3 both switches 19 and 20 are in the contact-making position so that the heating resistor 7, the heating plate 9 and the motor 6' carry current. The switch 20 changing the direction of rotation of the motor 6' is locked by the arm 26 of the double-armed lever 25, 26 engaging the notch of the notched disc 24 arranged on the shaft 22 of the switch 20. If, however, the switch 19 is moved into the position in which it interrupts the current the arm 25 of the double-armed lever 25, 26 enters one of the notches of the notched disc 23 arranged on the shaft 21 of the switch 19 so that the arm 26 leaves the notch in the notched disc 24 arranged on the shaft 22 of the switch 20 so that the latter is no longer locked. By actuating the switch 20 the motor 6' is connected so that it will rotate in opposite direction after another actuation of switch 19. It should be noted that by bringing the switch 20 into the other position thereof the heating resistor 7 and the heating plate 9 are disconnected.

A double throw switch 27 is connected to the switch 20 so that it automatically connects the heating plate 9 when the cantilever 9' is brought into the second position thereof in which the heating plate 9 is arranged flush with the table plate 1 as shown in full lines in Fig. 1.

A three-stage switch allows to switch in any of three connections 28', 28'', and 28''' leading to different circuits of the heating plate 9 so that the temperature of the heating plate 9 can be controlled.

The operation of the electric table described hereinabove will be clear to any person skilled in the art from the above explanations and the drawings. The electric table according to the invention constitutes an apparatus which can be used for the most varied purposes. If, for instance, the fan-motor 6' and the heating resistor 7 are switched on a flow of hot air will be directed at once toward the feet of persons sitting around the electric table. If the electric motor 6' is driven in opposite direction and the heating resistor 7 is not connected, a flow of cool air is caused to the second opening 8 defined by the square frame 2 and the edge portion 1'' so that the persons sitting around the table feel a pleasant sensation of cooling. In either case the air stream may be scented by perfume arranged in the container 14. The heating plate 9 carried by the cantilever 9' can either be used as an additional heating resistor aiding the heating resistor 7 or as a hot plate for cooking purposes, said hot plate being connected to the electric table without a special connection cable. Furthermore, the warm plate 12 joined to the table plate 1' serves for keeping beverages such as coffee or tea warm without boiling.

It will be understood that each of the elements described above, or two or more together, may also find a useful application in other types of electric tables differing from the types described above.

While the invention has been illustrated and described as embodied in an electric table equipped with a plurality of electric appliances, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; and a reversible electric motor driving said fan so as to rotate the same in opposite directions, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

2. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; an electric heating resistor arranged in said first opening underneath said fan; and a reversible electric motor driving said fan so as to rotate the same in opposite directions, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

3. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; an electric heating resistor arranged in said first opening underneath said fan; switching means for switching said electric heating resistor in and out; and a reversible electric motor driving said fan so as to rotate the same in opposite directions, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

4. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; a reversible electric motor driving said fan so as to rotate the same in opposite directions; an electric heating plate; and a cantilever carrying said electric heating plate and being pivoted to said wall, said cantilever being movable from a first position in which said electric heating plate is arranged underneath said first centrally located opening to a second position in which said electric heating plate is arranged flush with said table plate, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

5. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; a reversible electric motor driving said fan so as to rotate the same in opposite directions; an electric heating plate; and a cantilever carrying said electric heating plate and being pivoted to said wall, said cantilever being movable from a first position in which said electric heating plate is arranged underneath said first centrally located opening to a second position in which said electric heating plate is arranged flush with said table plate, said heating plate serving in the first position of said cantilever for heating the air moved by said fan and in the second position of said cantilever as a cooking appliance connected with said table plate, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

6. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; a reversible electric motor driving said fan so as to rotate the same in opposite directions; an electric heating plate; a cantilever carrying said electric heating plate and being pivoted to said wall, said cantilever being movable from a first position in which said electric heating plate is arranged underneath said first centrally located opening to a second position in which said electric heating plate is arranged flush with said table plate; and a hinge for securing said cantilever in the first and second positions thereof, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

7. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; a reversible electric motor driving said fan so as to rotate the same in opposite directions; an electric heating plate; a cantilever carrying said electric heating plate and being pivoted to said wall, said cantilever being movable from a first position in which said electric heating plate is arranged underneath said first centrally located opening to a second position in which said electric heating plate is arranged flush with said table plate, said heating plate serving in the first position of said cantilever for heating the air moved by said fan and in the second position of said cantilever as a cooking appliance connected with said table plate; and a hinge for securing said cantilever in the first and second positions thereof, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

8. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; an electric heating resistor arranged in said first opening underneath said fan; switching means for switching said electric heating resistor in and out; a reversible electric motor driving said fan so as to rotate the same in opposite directions; an electric heating plate; and a cantilever carrying said electric heating plate and being pivoted to said wall, said cantilever being movable from a first position in which said electric heating plate is arranged underneath said first centrally located opening to a second position in which said electric heating plate is arranged flush with said table plate, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

9. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; an electric heating resistor arranged in said first opening underneath said fan; switching means for switching said electric heating resistor in and out; a reversible electric motor driving said fan so as to rotate the same in opposite directions; an electric heating plate; and a cantilever carrying said electric heating plate and being pivoted to said wall, said cantilever being movable from a first position in which said electric heating plate is arranged underneath said first centrally located opening to a second position in which said electric heating plate is arranged flush with said table plate, said heating plate serving in the first position of said cantilever for heating the air moved by said fan together with said heating resistor and in the second position of said cantilever as a cooking appliance connected with said table plate, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

10. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; an electric heating resistor arranged in said first opening underneath said fan; switching means for switching said electric heating resistor in and out; a reversible electric motor driving said fan so as to rotate the same in opposite directions; an electric heating plate; a cantilever carrying said electric heating plate and being pivoted to said wall, said cantilever being movable from a first position in which said electric heating plate is arranged underneath said first centrally located opening to a second position in which said electric heating plate is arranged flush with said table plate; and a hinge for securing said cantilever in the first and second positions thereof, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

11. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; an electric heating resistor arranged in said first opening underneath said fan; switching means for switching said electric heating resistor in and out; a reversible electric motor driving said fan so as to rotate the same in opposite directions; an electric heating plate; a cantilever carrying said electric heating plate and being pivoted to said wall, said cantilever being movable from a first position in which said electric heating plate is arranged underneath said first centrally located opening to a second position in which said electric heating plate is arranged flush with said table plate, said heating plate serving in the first position of said cantilever for heating the air moved by said fan together with said heating resistor and in the second position of said cantilever as a cooking appliance connected with said table plate; and a hinge for securing said cantilever in the first and second positions thereof, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

12. An electric table, comprising, in combination, a table plate having an edge portion; an electric warming plate forming part of said table plate; a wall forming an air channel arranged underneath said table plate, said channel having a first opening located centrally underneath, and at a distance from, said table plate, said channel and said edge portion defining a second opening with each other; a fan arranged in said air channel above said first opening thereof; and a reversible electric motor driving said fan so as to rotate the same in opposite directions, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through second opening defined by said channel and said edge portion and discharges the air through said centrally located first opening of said channel.

13. An electric table, comprising, in combination, a table plate having an edge portion; an electric warming plate forming part of said table plate; a wall forming an air channel arranged underneath said table plate, said channel having a first opening located centrally underneath, and at a distance from, said table plate, said channel and said edge portion defining a second opening with each other; a fan arranged in said air channel above said first opening thereof; an electric heating resistor arranged in said first opening underneath said fan; switching means for switching said electric heating resistor in and out; and a reversible electric motor driving said fan so as to rotate the same in opposite directions, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

14. An electric table, comprising, in combination, a table plate having an edge portion; an electric warming plate forming part of said table plate; a wall forming an air channel arranged underneath said table plate, said channel having a first opening located centrally underneath, and at a distance from, said table plate, said channel and said edge portion defining a second opening with each other; a fan arranged in said air channel above said first opening thereof; a reversible electric motor driving said fan so as to rotate the same in opposite directions; an electric heating plate; and a cantilever carrying said electric heating plate and being pivoted to said wall, said cantilever being movable from a first position in which said electric heating plate is arranged underneath said first centrally located opening to a second position in which said electric heating plate is arranged flush with said table plate, said heating plate serving in the first position of said cantilever for heating the air moved by said fan and in the second position of said cantilever as a cooking appliance connected with said table plate, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

15. An electric table, comprising, in combination, a table plate having an edge portion; an electric warming plate forming part of said table plate; a wall forming an air channel arranged underneath said table plate, said channel having a first opening located centrally underneath, and at a distance from, said table plate, said channel and said edge portion defining a second opening with each other; a fan arranged in said air channel above said first opening thereof; a reversible electric motor driving said fan so as to rotate the same in opposite directions; an electric heating plate; a cantilever carrying said electric heating plate and being pivoted to said wall, said cantilever being movable from a first position in which said electric heating plate is arranged underneath said first centrally located opening to a second position in which said electric heating plate is arranged flush with said table plate, said heating plate serving in the first position of said cantilever for heating the air moved by said fan and in the second position of said cantilever as a cooking appliance connected with said table plate; and a hinge for securing said cantilever in the first and second positions thereof, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

16. An electric table, comprising, in combination, a table plate having an edge portion; an electric warming plate forming part of said table plate; a wall forming an air channel arranged underneath said table plate, said channel having a first opening located centrally underneath, and at a distance from, said table plate, said channel and said edge portion defining a second opening with each other; a fan arranged in said air channel above said first opening thereof; an electric heating resistor arranged in said first opening underneath said fan; switching means for switching said electric heating resistor in and out; a reversible electric motor driving said fan so as to rotate the same in opposite directions; an electric heating plate; a cantilever carrying said electric heating plate and being pivoted to said wall, said cantilever being movable from a first position in which said electric heating plate is arranged underneath said first centrally located opening to a second position in which said electric heating plate is arranged flush with said table plate, said heating plate serving in the first position of said cantilever for heating the air moved by said fan together with said heating resistor and in the second position of said cantilever as a cooking appliance connected with said table plate; and a hinge for securing said cantilever in the first and second positions thereof, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

17. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; a reversible electric motor driving said fan so as to rotate the same in opposite directions; and a container for perfumes arranged in said wall so as to scent the air passing through said air channel, whereby said fan when driven by said electric motor in one direction sucks air into said channel through said first centrally located opening thereof and discharges the air through said second opening defined by said channel and said edge portion whereas said fan when driven by said electric motor in the opposite direction sucks air into said channel through said second opening defined by said channel and said edge portion and discharges the air through said centrally located first opening of said channel.

18. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; a reversible electric motor driving said fan so as to rotate the same in opposite directions; an electric heating plate; a cantilever carrying said electric heating plate and being pivoted to said wall, said cantilever being movable from a first position in which said electric heating plate is arranged underneath said first centrally located opening to a second position in which said electric heating plate is arranged flush with said table plate, said heating plate serving in the first position of said cantilever for heating the air moved by said fan and in the second position of said cantilever as a cooking appliance connected with said table plate; switching means for said reversible motor and said electric heating plate; and means for interconnecting said switching means so that the direction of rotation of said fan can only be changed when said electric motor is not supplied with current and said heating plate can be switched in only in the second position of said cantilever and in the first position thereof when said electric motor drives said fan in said opposite direction in which air is sucked into said channel through said second opening defined by said channel and said edge portion.

19. An electric table, comprising, in combination, a table plate having an edge portion; a wall forming an air channel arranged underneath said table plate, said channel having a first opening located centrally underneath, and at a distance from, said table plate, said channel and said edge portion defining a second opening with each other; a fan arranged in said air channel above said first opening thereof; a reversible electric motor driving said fan so as to rotate the same in opposite directions; an electric heating plate; a cantilever carrying said electric heating plate and being pivoted to said wall, said cantilever being movable from a first position in which said electric heating plate is arranged underneath said first centrally located opening to a second position in which said electric heating plate is arranged flush with said table plate, said heating plate serving in the first position of said cantilever for heating the air moved by said fan and in the second position of said cantilever as a cooking appliance connected with said table plate; switching means for said reversible motor and said electric heating plate; means for interconnecting said switching means so that the direction of rotation of said fan can only be changed when said electric motor is not supplied with current and said heating plate can be switched in only in the second position of said cantilever and in the first position thereof when said electric motor drives said fan in said opposite direction in which air is sucked into said channel through said second opening defined by said channel and said edge portion; and a hinge for securing said cantilever in the first and second positions thereof.

WERNER BRUCHHAUSEN.

References Cited in the file of this patent

UNITED STATES PATENTS

| Number | Name | Date |
|---|---|---|
| 2,037,857 | Fox | Apr. 21, 1936 |
| 2,124,120 | Pogue | July 19, 1938 |
| 2,196,035 | Shaw | Apr. 2, 1940 |
| 2,309,513 | Kramer | Jan. 26, 1943 |
| 2,453,425 | Freed | Nov. 9, 1948 |